(12) United States Patent
Huang et al.

(10) Patent No.: US 8,331,498 B2
(45) Date of Patent: Dec. 11, 2012

(54) BLIND MODULATION DETECTION

(75) Inventors: Wensheng Huang, Cary, NC (US);
Zhiyong Yan, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 893 days.

(21) Appl. No.: 12/422,578

(22) Filed: Apr. 13, 2009

(65) Prior Publication Data

US 2010/0260292 A1 Oct. 14, 2010

(51) Int. Cl.
*H04L 27/00* (2006.01)
(52) U.S. Cl. ...................................................... 375/340
(58) Field of Classification Search .................. 375/316, 375/324, 340; 329/316; 455/21
See application file for complete search history.

(56) References Cited

U.S. PATENT DOCUMENTS

| 6,463,107 | B1 * | 10/2002 | Lindoff et al. | 375/343 |
| 7,697,639 | B2 * | 4/2010 | Kim et al. | 375/329 |
| 7,848,439 | B2 * | 12/2010 | She et al. | 375/260 |
| 2007/0041473 | A1 * | 2/2007 | Chen et al. | 375/329 |
| 2007/0047587 | A1 * | 3/2007 | Kuo et al. | 370/497 |

FOREIGN PATENT DOCUMENTS

| EP | 1 248 427 A1 | 10/2002 |
| EP | 1 760 979 A1 | 3/2007 |
| WO | WO 2006/102572 | 9/2006 |

* cited by examiner

*Primary Examiner* — Khanh C Tran

(57) ABSTRACT

In receiving a radio block comprising a plurality of bursts, burst data is saved prior to demodulating each burst using an independent preliminary modulation technique decision. When a global modulation technique decision over the radio burst is formulated, if the preliminary modulation technique decision for one or more bursts disagrees, data associated with that burst may be retrieved and demodulated using the global modulation technique decision. In one embodiment, the mismatching burst is erased and decoding over the block is attempted, with the second demodulation being performed only if a decoding metric indicates decode errors. In another embodiment, each mismatching block is re-demodulated as soon as a global modulation technique decision is formulated and a mismatch to the preliminary modulation technique decision is detected. In both embodiments, an increase in the number of soft bits improves decoder performance.

6 Claims, 5 Drawing Sheets

BLIND MODULATION DETECTION

TECHNICAL FIELD

The present invention relates generally to wireless communication receivers, and in particular to improved blind modulation detection receivers.

BACKGROUND

Wireless communication network protocols and standards continuously evolve to support ever-higher data rates. A known technique for increasing data rates is link adaptation, also known in the art as adaptive modulation and coding. In link adaptation, various signal and protocol parameters—such as the modulation technique, selection of forward error correcting (FEC) codes, and the like—are dynamically varied to match changing conditions of the radio link. Conditions of the radio link giving rise to link adaptation include path loss, interference from other signals, receiver sensitivity, available transmitter power margin, and the like. As an example of adaptive modulation technique, in the GSM system, packet switched channels may be modulated using GMSK, QPSK, 8 PSK, 16 QAM, or 32 QAM.

GPRS, EGPRS, and EGPRS2 systems transmit a radio block in the downlink comprising four bursts, where each burst is one 576 u-sec TDMA time slot. All bursts in the radio block are modulated using the same modulation technique. However, a link adaptation function in a base station transmitter may modulate different radio blocks within a temporary block flow (TBF) using different modulation techniques, depending on then-current channel conditions. The transmitter does not include an indication of the modulation technique in the downlink signal. Accordingly, it is unknown at the receiver.

The downlink signal does include a known training sequence in each burst. Blind modulation decision receivers demodulate the known training sequence using each allowed modulation technique. They then compare demodulation quality metrics to determine the most likely modulation technique, and independently demodulate each burst using that technique. After all bursts in a block are demodulated, the data are assembled and decoded.

While all of the bursts in a radio block are modulated using the same modulation technique, the receiver's modulation technique decisions for all bursts in a block do not necessarily agree. In conventional receivers, when a burst is demodulated using a modulation technique decision that does not match the modulation technique decision used for the other bursts in the block, the odd burst is erased by setting all the soft bits output by the demodulator to zero—effectively assigning each bit an equal probability of being a 0 or 1—and adjusting the number of bits in the burst according to the final decision of modulation technique for all the bursts in a radio block.

When one or more bursts in a block are erased due to an incorrect modulation technique decision, the probability of correctly decoding data decreases. In particular, the uplink state flag (USF) may be decoded incorrectly. The USF is the mechanism by which the network informs a mobile station which time slot to use for uplink transmission. If the mobile erroneously decodes the USF for another mobile as its own, it will transmit at the same time as another mobile station, causing interference at the base station, which may not be able to decode either uplink transmission. If the mobile fails to decode a USF intended for it, it will fail to transmit data when the base station is expecting it, wasting air interface resources and reducing the uplink data throughput. Modulation technique detection failure is the leading cause of USF decoding error.

SUMMARY

According to embodiments disclosed and claimed herein, in receiving a radio block comprising a plurality of bursts, burst data is saved prior to demodulating each burst using an independent preliminary modulation technique decision. When a global modulation technique decision over all the radio bursts in the radio block is formulated, if the preliminary modulation technique decision for one or more bursts disagrees, data associated with that burst may be retrieved and demodulated using the global modulation technique decision. In one embodiment, the mismatching burst(s) is(are) erased and decoding over the block is attempted, with the second demodulation only if a decoding metric indicates decode errors. In another embodiment, each mismatching block is re-demodulated as soon as a global modulation technique decision is formulated and a mismatch to the preliminary modulation technique decision is detected. In both embodiments, an increase in the number of useful soft bits improves decoder performance.

One embodiment relates to a method of blind modulation detection for demodulating and decoding a plurality of data bursts, each burst in the plurality modulated with the same modulation technique selected from a set of known modulation techniques. For each burst in the plurality, the burst data is saved to memory; a preliminary decision as to modulation technique is formulated; and the burst data are demodulated using the preliminary modulation decision. A global decision as to modulation technique is formulated over all bursts in the plurality. For each burst for which the preliminary decision differs from the global decision, the burst data are retrieved from memory and demodulated using the global modulation decision. The demodulated bursts are assembled, and the data is decoded.

DETAILED DESCRIPTION

Figure 1:
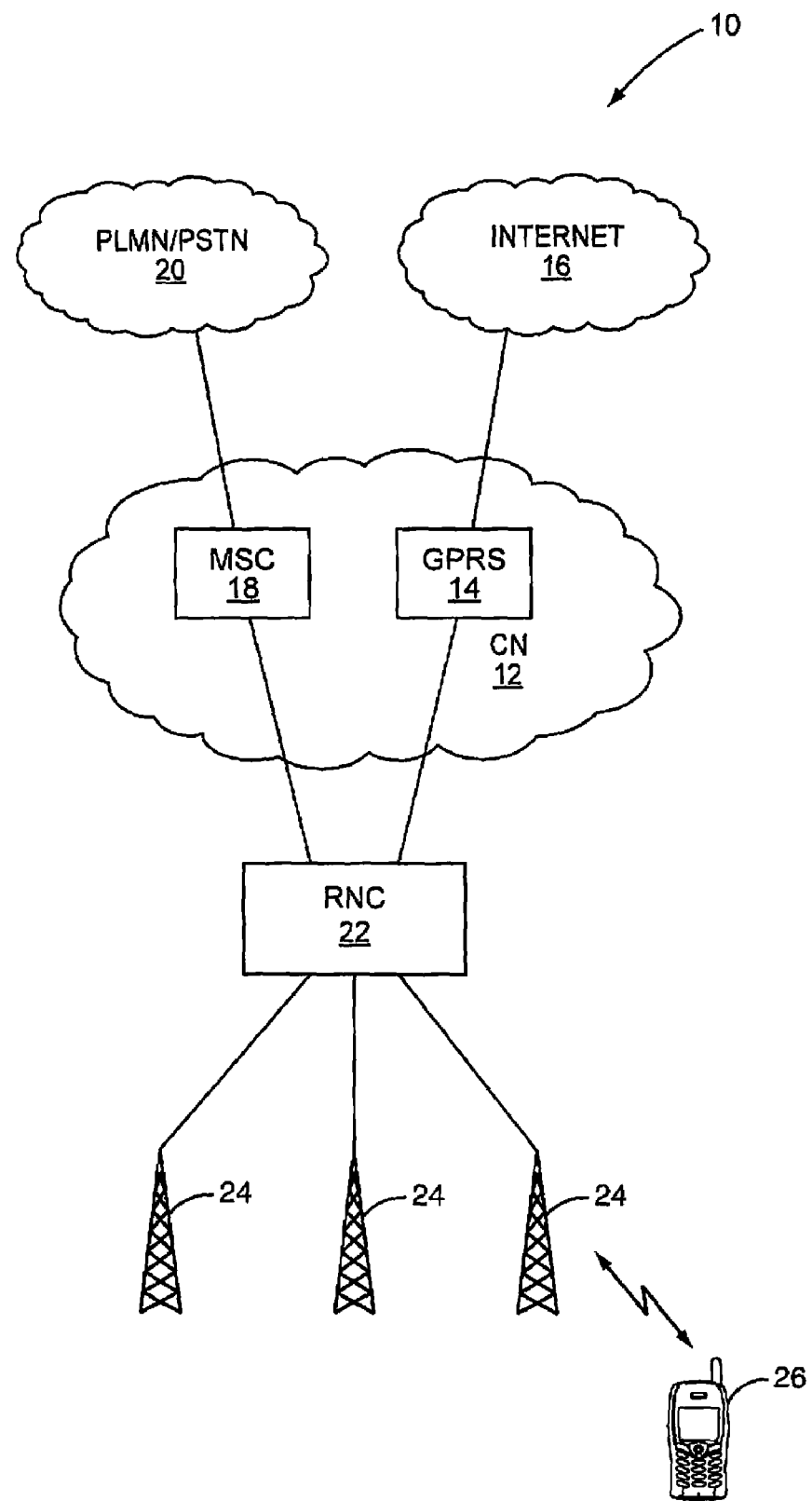
FIG. 1 is a functional block diagram of a wireless communication network.

FIG. 1 depicts a representative wireless communication network 10. Although the network 10 is described in terms of the Global System for Mobile communications (GSM), nodes with corresponding functionality exist in every wireless communication network 10, and the present invention is not limited to GSM systems. The network 10 includes a core network 12. Among numerous nodes not depicted for clarity, the core network 12 may include one or more General Packet Radio Service (GPRS) nodes 14, communicatively coupled to a packet network, such as the Internet 16. The core network 12 may also include one or more Mobile Switching Centers (MSC) 18, communicatively coupled to a circuit-switched network such as the Public Land Mobile Network (PLMN) and/or Public Switched Telephone Network (PSTN) 20. The GPRS 14 and MSC 18 are connected to a Radio Network Controller (RNC) 22 (also known as a Base Station Controller). The RNC 22 controls a plurality of Node B 24 (also known as Radio Base Stations, RBS, or Base Transceiver Stations, BTS). The Node B 24 contains the transceivers, antennae, and other equipment necessary to establish two-way, wireless communication with one or more User Equipment (UE) 26 (also known as a mobile station, mobile terminal, cell phone, and the like). The structure and operation of wireless communication networks 10, operating under a variety of protocols, are well known in the art.

The GPRS 14—and extensions such as EGPRS and EGPRS2—transmits data in a radio block comprising four bursts, where each burst is one 576 u-sec TDMA time slot. All four bursts in the block are modulated using the same modulation technique (e.g., one of GMSK, QPSK, 8 PSK, 16 QAM, or 32 QAM). However, a link adaptation algorithm in the core network 12 may dynamically select a different modulation technique for each radio block, in response to changing channel conditions. The receiver 26 is not explicitly informed of the modulation technique selected, and must perform blind modulation detection.

In prior art blind modulation detection methods, the receiver independently formulates a preliminary modulation technique decision for each burst, and uses that decision to demodulate the burst. When a global modulation technique decision is made for all four bursts, any burst that was demodulated using a wrong preliminary modulation decision (that is, one that does not match the global decision) is erased, and thus does not contribute to the decoding process. The erasure has been justified as necessary due to real-time latency requirements and limited processing power.

According to embodiments of the present invention, the original data for all four bursts are saved in case it is necessary to re-demodulate one or more bursts, if a preliminary modulation technique decision turns out to be erroneous. Two embodiments are presented.

Figure 2A:
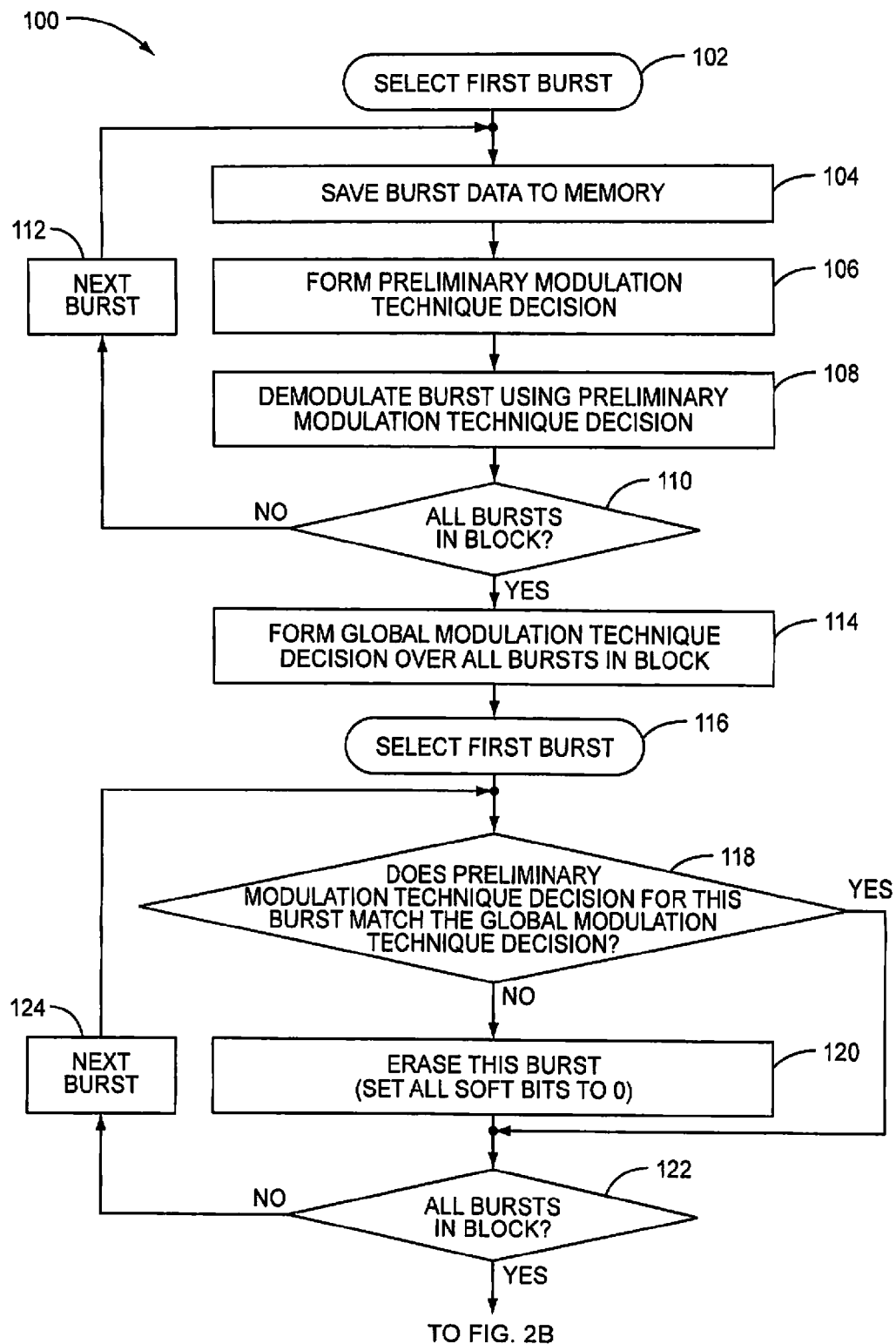
FIG. 2 is a flow diagram of a method of blind modulation detection according to one embodiment of the present invention.
Figure 2B:
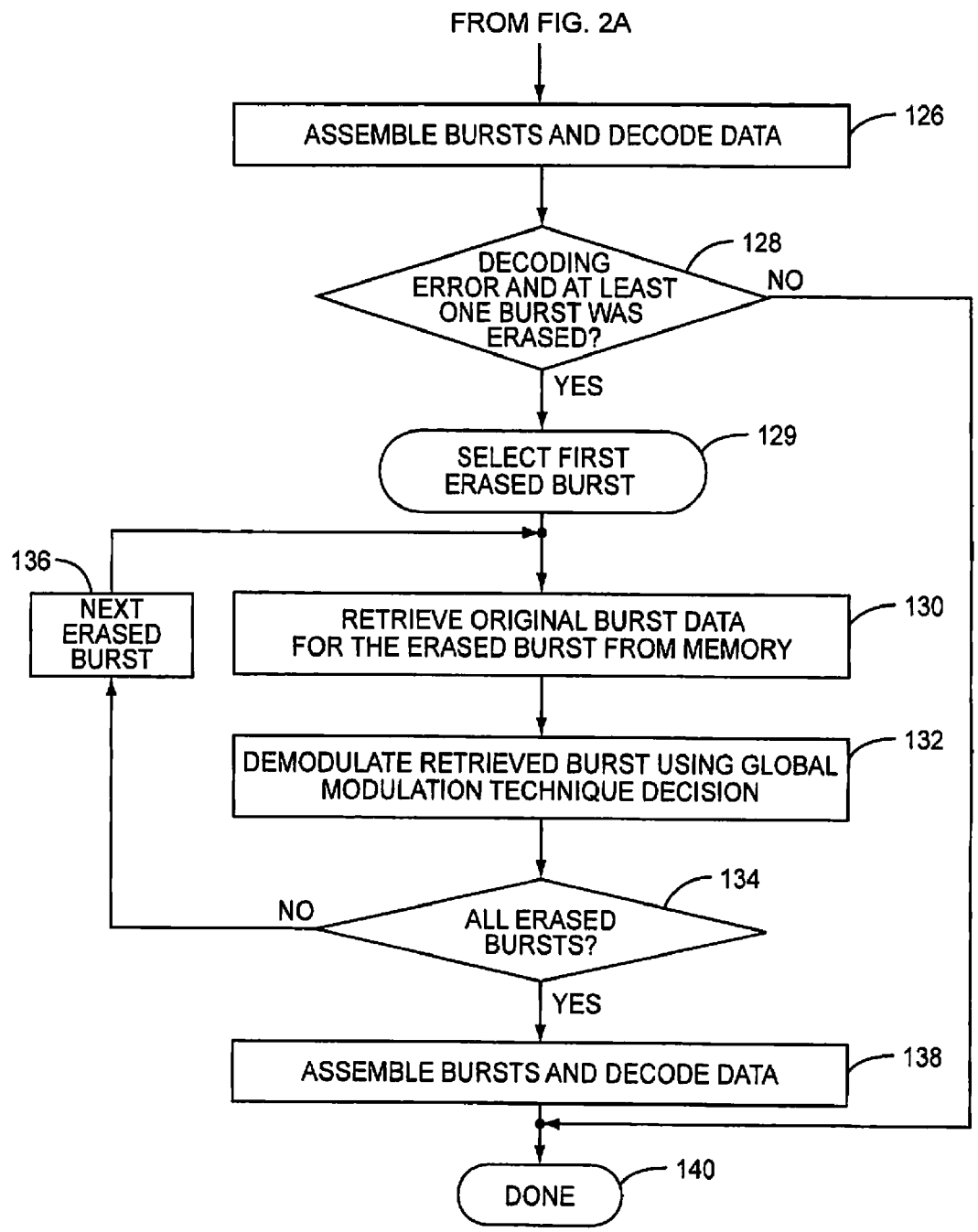

FIG. 2 depicts a method 100 of blind demodulation according to a first embodiment presented herein. The first embodiment utilizes, and builds upon, the prior art process of burst erasure and decoding. Initially, the first burst in a radio block is selected for processing (step 102). The burst data are saved to memory (step 104). A preliminary modulation technique decision is formulated (step 106), such as by demodulating a known training sequence using all allowed modulation techniques, and comparing quality metrics output by the demodulators. The burst is demodulated using the preliminary decision (step 108). This process is repeated for all four blocks in a radio burst (steps 110, 112).

After all the bursts are demodulated using independent, preliminary modulation technique decisions, a global modulation technique decision is formulated over the radio block (step 114). The bursts are then considered in turn (step 116) (although those of skill in the art will recognize that two or more of the bursts could alternatively be considered in parallel). If a block was demodulated using a preliminary modulation technique decision that does not match the global modulation technique decision (step 118), it is erased by setting the soft bits output by the demodulator to zero (step 120). If the modulation technique decisions match (step 118), no erasure is performed. This comparison and possible erasure is performed over all bursts in the block (steps 122,124).

The demodulated burst data are then assembled and decoded (step 126). As part of the decoding process, a decoding metric, such as a CRC check, indicates whether errors were encountered in the decoding process. If the decoding metric does not indicate any error (block 128), the method terminates (step 140). Note that in this case, the method devolves into the prior art blind modulation detection technique of burst erasure in the event of a modulation technique decision mismatch (with the additional step of having stored the data for all bursts, at step 204). However, if the decoding metric indicates an error, and at least one burst was erased (step 128), then according to the first embodiment of the inventive method 100, the stored data associated with the first erased burst (block 129) are retrieved from memory (step 130), and the burst is demodulated using the global modulation technique decision (step 132). This is repeated for all erased bursts (blocks 134, 136). The data from all bursts are again assembled and decoded (step 138). By demodulating the erased bursts using the global modulation technique decision, more soft bits are present to greatly increase the probability of a correct decoding operation. The method then terminates (step 140).

Blind modulation detection according to the first embodiment has the advantage that, if the block can be successfully decoded using the erased burst(s), no additional latency is introduced by performing a second demodulation using the global modulation technique decision, or a second decoding operation. However, if the prior art technique produced decode errors, this embodiment requires two demodulation operations for the erased bursts, and two radio block decoding operations.

Figure 3A:
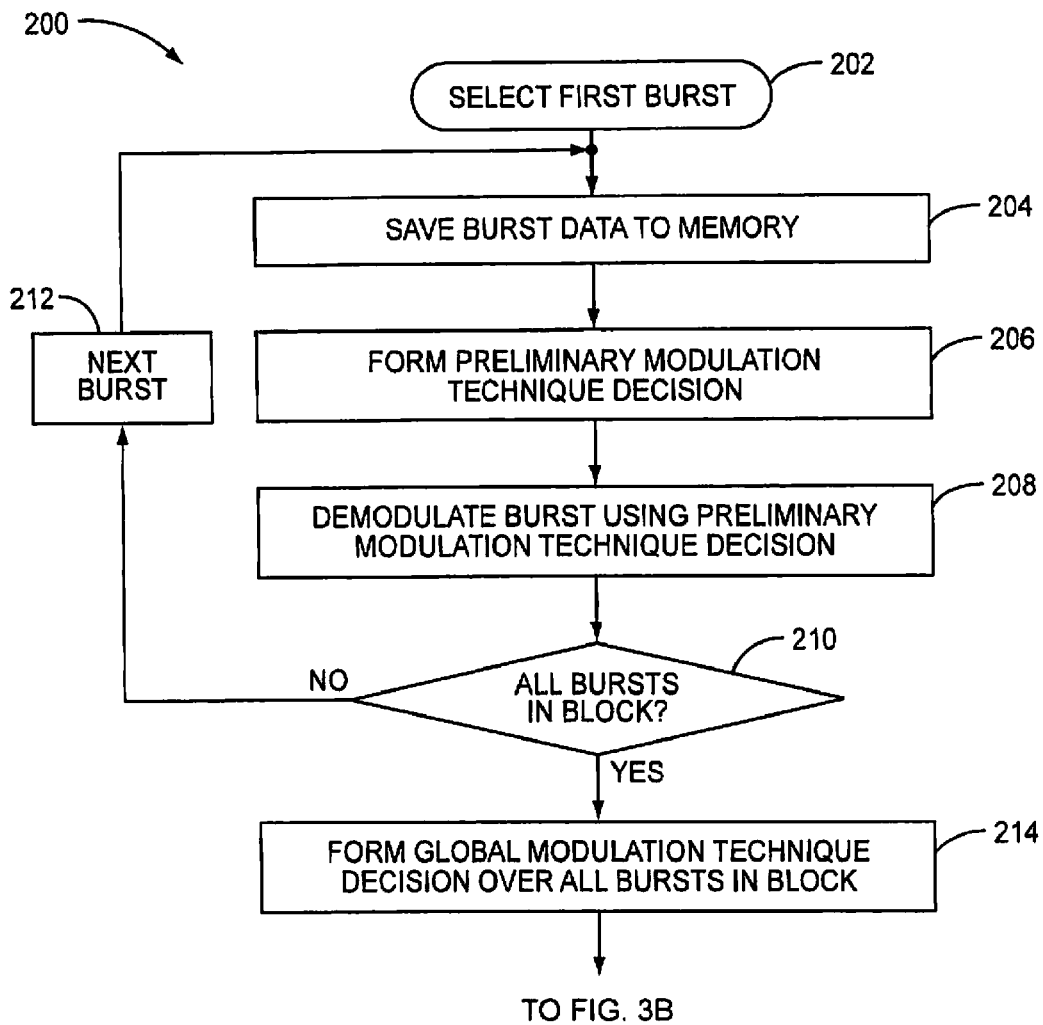
FIG. 3 is a flow diagram of a method of blind modulation detection according to another embodiment of the present invention.
Figure 3B:
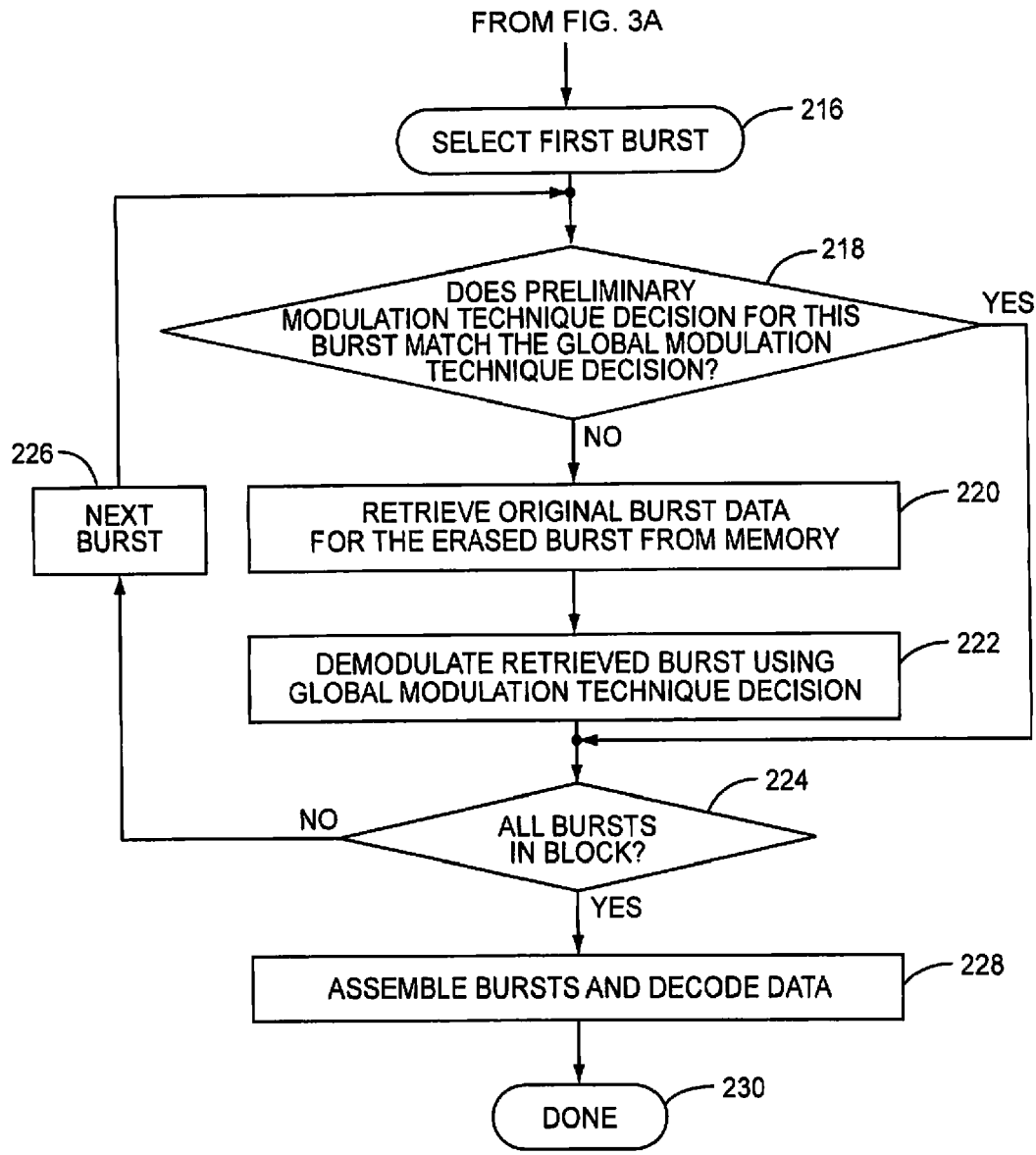

FIG. 3 depicts a method 200 of blind demodulation according to a second embodiment of the present invention. As with the first embodiment, the first burst in a radio block is initially selected for processing (step 202), and the burst data are saved to memory (step 204). A preliminary modulation technique decision is formulated (step 206), and the burst is demodulated using the preliminary decision (step 208). This process is repeated for all four blocks in a radio burst (steps 210, 212).

After all the bursts are demodulated using preliminary modulation technique decisions, a global modulation technique decision is formulated over the radio block (step 214). The bursts are then considered in turn (step 216). If a block was demodulated using a preliminary modulation technique decision that matches the global modulation technique decision (step 218), then the next block is selected (steps 224, 226), and its modulation decisions compared (block 218). If a block was demodulated using a preliminary modulation technique decision that does not match the global modulation technique decision (step 218), the stored data associated with the mismatching burst is retrieved from memory (step 220), and the burst is demodulated using the global modulation technique decision (step 222). After all bursts are processed (steps 224, 226), the data from all bursts are assembled and decoded (step 228). The method then terminates (step 230).

In the second embodiment, no erasure and attempt to decode is performed. Rather, two demodulation operations are always performed in the event of a modulation decision mismatch. As compared to the first embodiment, the second embodiment forgoes the possibility of a successful decode without additional demodulation (by erasure and decoding), but also reduces the amount of additional processing if additional demodulation is necessary, by eliminating one of the two decode operations. In practice, the second embodiment may yield better performance when processing data that were encoded using a high code rate.

In both embodiments, the data for bursts with an incorrect preliminary modulation technique detection is demodulated using the preliminary modulation technique detection rather than being erased. The decoder thus has more useful information in the decoding process, and the probability of successful decoding is increased. As a result, both the USF decoding and the payload data decoding performance are improved. Subsequently, the data throughput in both downlink and uplink is improved. This proposed method for improvement of decoding is general and thus can be used with any existing ARQ algorithms such as Incremental Redundancy (IR) decoding.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of blind modulation detection for demodulating and decoding a plurality of data bursts, each data burst in the plurality modulated with the same modulation technique selected from a set of known modulation techniques, by a receiver in a wireless communication network, comprising:
  for each data burst in the plurality,
    saving each data burst to memory;
    independently formulating a preliminary decision as to which modulation technique was applied to each data burst; and
    demodulating each data burst using the preliminary modulation decision;
  formulating a global decision as to modulation technique based on an analysis of all data bursts in the plurality;
  for each data burst for which the preliminary decision differs from the global decision,
    retrieving the original data burst that was erroneously decoded, from memory; and
    demodulating the retrieved data burst using the global modulation decision;
  assembling the demodulated data bursts; and
  decoding the assembled data bursts.

2. The method of claim 1 further comprising:
  prior to retrieving the original data burst from memory,
    erasing each data burst for which the preliminary decision differs from the global decision by setting the demodulator output soft bits to zero;
    assembling the data bursts demodulated using a preliminary modulation decision;
    decoding the data burst; and
    retrieving data burst from memory and demodulating it using the global modulation decision only if a decoding metric indicates decoding errors.

3. The method of claim 2 wherein the decoding metric is a Cyclic Redundancy Check (CRC).

4. The method of claim 1 wherein formulating a preliminary decision as to modulation technique comprises demodulating a known training sequence in the data burst using each modulation technique in the known set, and comparing demodulation metrics associated with each modulating technique.

5. The method of claim 1 wherein formulating a global decision as to modulation technique over all data bursts in the plurality comprises comparing the preliminary modulation decision for each data burst in the plurality.

6. A method of blind modulation detection for demodulating and decoding a plurality of data bursts, each data burst in the plurality modulated with the same modulation technique selected from a set of known modulation techniques, by a receiver in a wireless communication network, comprising:
  for each data burst in the plurality,
    saving the data burst to memory;
    formulating a preliminary decision as to modulation technique; and
    demodulating the data burst using the preliminary modulation decision;
  formulating a global decision as to modulation technique over all data bursts in the plurality;
  erasing each data burst for which the preliminary decision differs from the global decision by setting the demodulator output soft bits to zero;
  assembling the data bursts which were demodulated using a preliminary modulation decision;
  decoding the data burst; and
  if a decoding metric indicates decoding errors,
    for each data burst for which the preliminary decision differs from the global decision,
      retrieving the data burst from memory; and
      demodulating the data burst using the global modulation decision;
    assembling the demodulated data bursts; and
    decoding the data burst.

* * * * *